(12) United States Patent
Gerhardt et al.

(10) Patent No.: US 8,256,090 B2
(45) Date of Patent: Sep. 4, 2012

(54) FASTENING SYSTEM HEAD, FASTENING SYSTEM, AND METHOD FOR FEEDING AND FASTENING ELEMENTS

(75) Inventors: Alfred Gerhardt, Lahnau (DE); Florian Steinmueller, Heuchelheim (DE); Sascha Becker, Muecke (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/049,472

(22) Filed: Mar. 16, 2011

(65) Prior Publication Data

US 2011/0162185 A1    Jul. 7, 2011

Related U.S. Application Data

(62) Division of application No. 11/511,660, filed on Aug. 29, 2006, now Pat. No. 7,926,161.

(30) Foreign Application Priority Data

Sep. 9, 2005   (DE) .......................... 10 2005 044 367

(51) Int. Cl.
    *B23P 17/00*    (2006.01)
(52) U.S. Cl. ............ 29/525.01; 29/429; 29/705; 29/714
(58) Field of Classification Search ............... 29/525.01, 29/429, 714, 705
    See application file for complete search history.

(56) References Cited

U.S. PATENT DOCUMENTS

| | | | |
|---|---|---|---|
| 4,420,674 A | 12/1983 | Jordan | |
| 5,568,715 A * | 10/1996 | Ebel et al. | ......................... 53/54 |
| 5,779,609 A | 7/1998 | Cullen et al. | |
| 6,253,448 B1 | 7/2001 | Zieve et al. | |
| 6,264,063 B1 | 7/2001 | Turner et al. | |
| 7,045,741 B2 | 5/2006 | Schmitt et al. | |
| 7,060,930 B2 | 6/2006 | Schmitt et al. | |
| 7,064,289 B2 | 6/2006 | Schmidt | |
| 7,084,371 B2 | 8/2006 | Hett | |
| 7,109,434 B2 | 9/2006 | Willershausen | |
| 7,119,302 B2 | 10/2006 | Schmitt et al. | |
| 7,291,802 B2 | 11/2007 | Muller et al. | |
| 7,518,084 B2 | 4/2009 | Schmitt et al. | |
| 2004/0025331 A1 | 2/2004 | Schmitt et al. | |

(Continued)

FOREIGN PATENT DOCUMENTS

DE    4236526    5/1994

(Continued)

OTHER PUBLICATIONS

European Search Report dated May 15, 2007, 13 pgs.

(Continued)

*Primary Examiner* — Derris Banks
*Assistant Examiner* — Azm Parvez
(74) *Attorney, Agent, or Firm* — Harness, Dickey & Pierce, P.L.C.

(57) ABSTRACT

A fastening system head for attachment to a movable frame, in particular to a robot, has a carrier to which a fastening tool is attached which is rotatable about an axis of rotation. The fastening tool has a holding device for an element fastenable to a component, and has a fastening drive device to move the holding device along a fastening direction for fastening. The axis of rotation is oriented crosswise to the fastening direction. A feed mechanism is included to feed elements to the fastening tool. At least one additional feed mechanism is provided on the fastening system head, for feeding elements to the fastening tool.

16 Claims, 5 Drawing Sheets

U.S. PATENT DOCUMENTS

Figure 1:
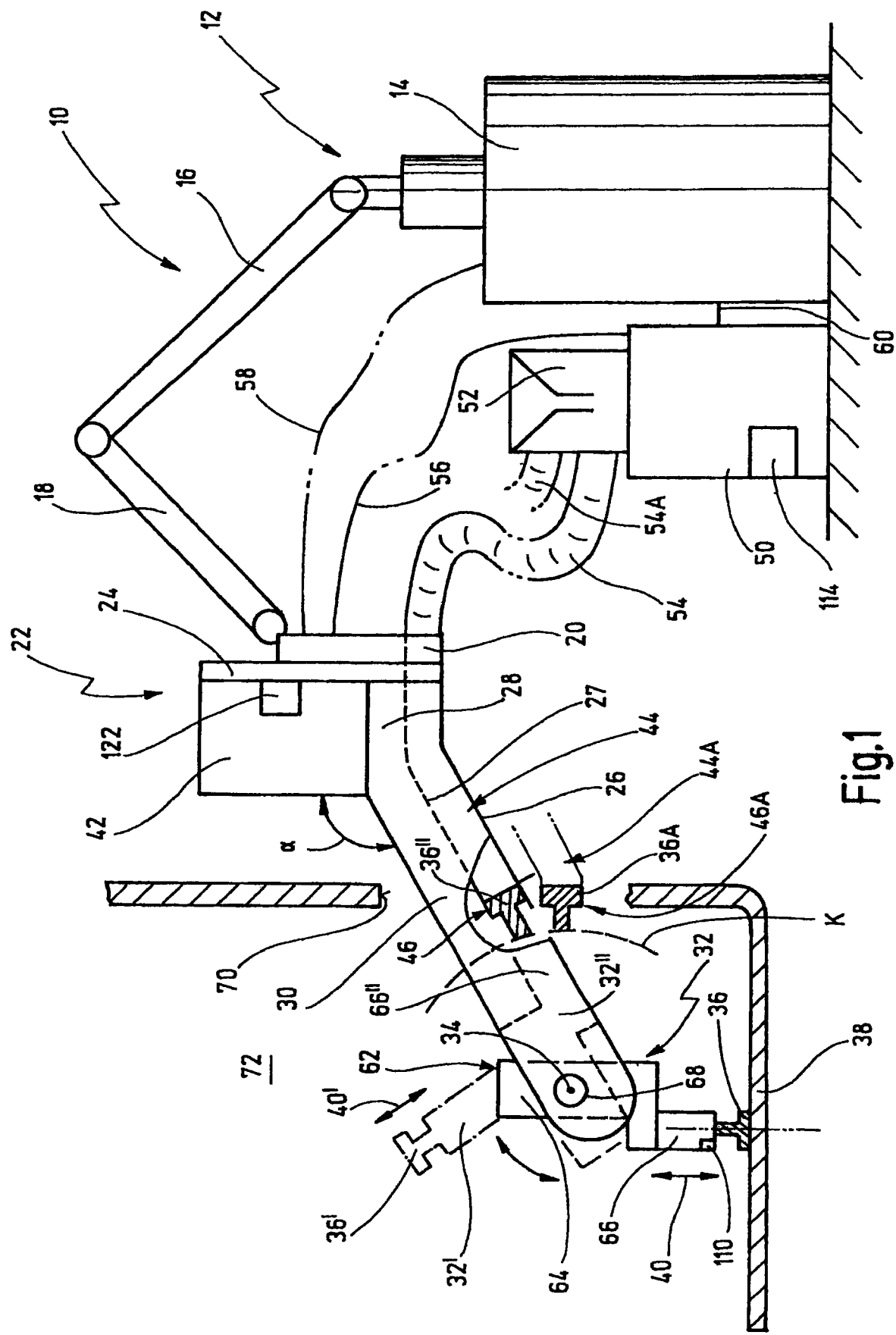

| | | | |
|---|---|---|---|
| 2004/0037634 A1* | 2/2004 | Muller et al. | 403/345 |
| 2007/0067975 A1 | 3/2007 | Gerhardt et al. | |

FOREIGN PATENT DOCUMENTS

| | | |
|---|---|---|
| DE | 20105789 | 8/2001 |
| DE | 10223147 | 11/2003 |
| DE | 10223154 | 11/2003 |
| GB | 2094202 A | 9/1982 |
| WO | WO0176800 | 10/2001 |

OTHER PUBLICATIONS

EPO Search Document dated Jan. 11, 2007, 6 pgs.

* cited by examiner

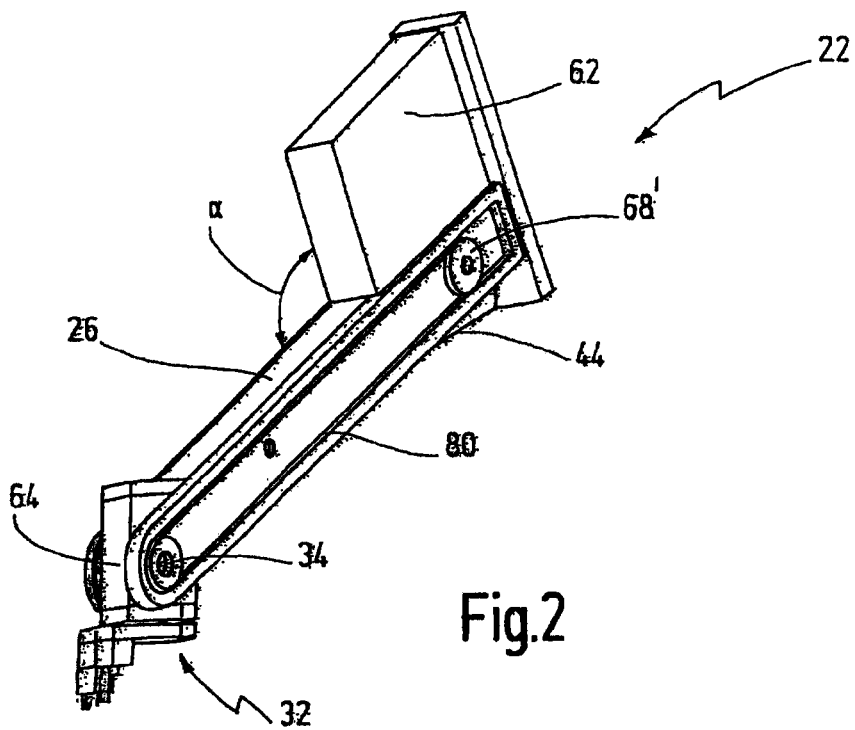
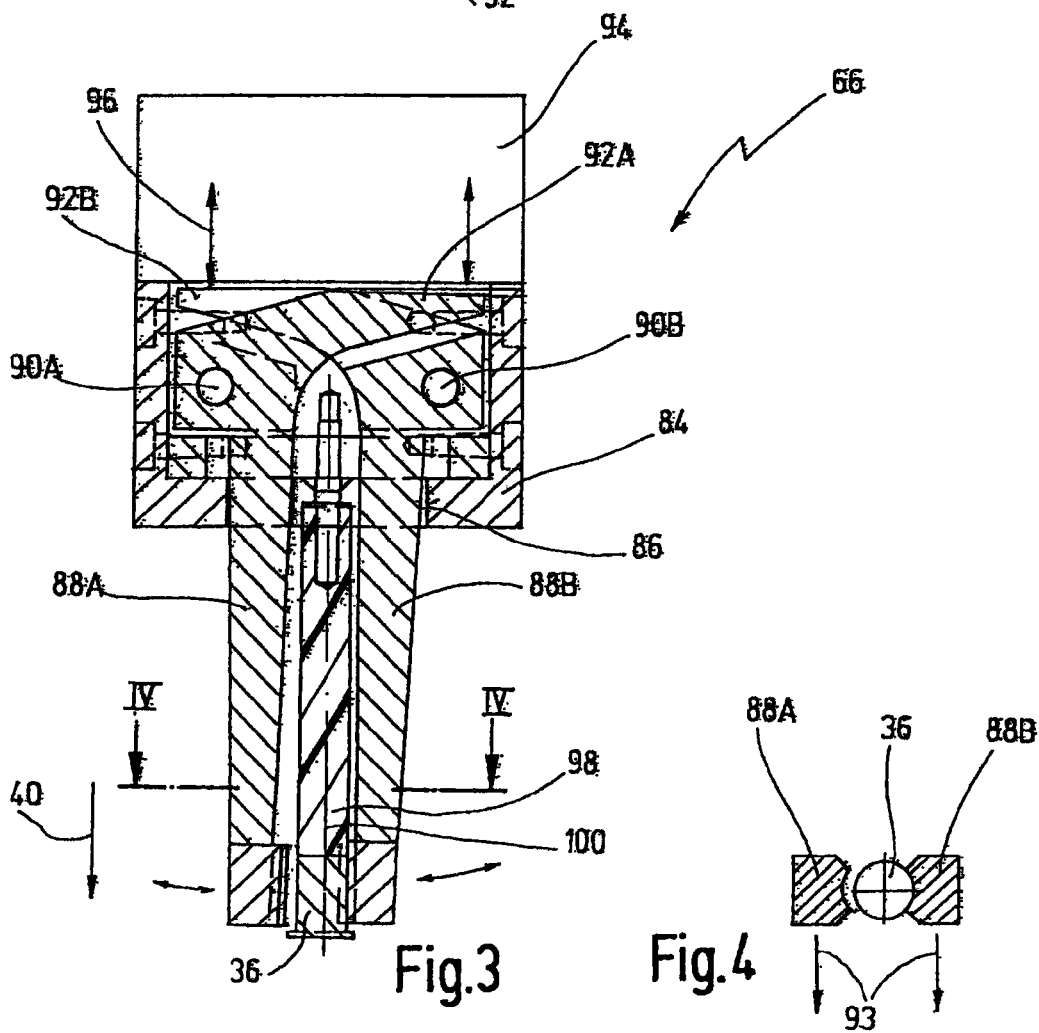

FASTENING SYSTEM HEAD, FASTENING SYSTEM, AND METHOD FOR FEEDING AND FASTENING ELEMENTS

CROSS-REFERENCE TO RELATED APPLICATIONS

This application is a divisional of U.S. patent application Ser. No. 11/511,660 filed on Aug. 29, 2006, which claimed priority to German Patent Application No. 10 2005 044 367.2, filed Sep. 9, 2005. The disclosures of the above applications are incorporated herein by reference.

FIELD

The present invention concerns a fastening system head for attachment to a movable frame, in particular to a robot, having a carrier to which a fastening tool is attached such that it is rotatable about an axis of rotation, wherein the fastening tool has a holding device for an element to be fastened to a component, and has a fastening drive device in order to move the holding device along a fastening direction for fastening, wherein the axis of rotation is oriented crosswise to the fastening direction, and having a feed mechanism for feeding elements to the fastening tool. A fastening system head of this nature is known from the patent document DE 102 23 154 A1.

The present invention further concerns a fastening system with a robot that is movable in at least two coordinate axes, and a fastening system head of the above described type that is affixed to the robot.

Finally, the present invention concerns a method for fastening an element to a component.

BACKGROUND

In the present context, the term "fastening" is intended to refer to all methods for attaching elements to components, in particular attaching metal elements to metal components, for example by adhesive bonding, by forming, such as riveting, or by the union of materials, such as welding, including short-cycle arc welding. Short-cycle arc welding is frequently referred to as stud welding, even though studs are not the only article welded in this manner.

Stud welding is used primarily, but not exclusively, in automotive production. In this context, metal elements, such as metal studs with and without threads, eyes, nuts, etc., are welded onto the sheet metal of a vehicle body. The metal elements then serve as anchors or mounting elements, for example for attaching passenger compartment fittings, lines, wiring and the like, to the body metal. The metal elements may be welding studs that have a shank, and a head somewhat larger in diameter than the stud shank. The fastening system head described in the aforementioned document is characterized in that it has an elongated carrier, one end of which can be attached to a robot. At the opposite, free end of the carrier, a fastening tool is mounted such that it is rotatable about an axis of rotation extending transverse to the longitudinal extent of the carrier.

The feed mechanism feeds singled elements to a transfer station on the carrier. The fastening tool is rotated on the carrier such that the readied element can be taken by the holding device. Then the fastening tool is rotated into a fastening position and a fastening operation is carried out. In this context, the fastening tool preferably has a linear motor as the fastening drive device.

Since a control unit can be arranged in the region of the attachment end of the carrier, the free end of the carrier with the fastening tool can be designed as a relatively small structural unit. Accordingly, the fastening tool can even be moved through openings to inaccessible parts of the component. Prior to the actual fastening process, the fastening tool is rotated into a suitable fastening position in each case. The fastening system head is oriented with respect to the component by means of the robot.

Then a conventional stud welding process, preferably in the drawn arc method, can be carried out. In this method, the stud is first placed on the component by means of the fastening drive device. Then a pre-conduction electric current is switched on, which flows through the stud and the component. Next, the stud is raised with respect to the component by means of the fastening drive device (linear motor). An electric arc forms.

The system then switches to the welding current. The end faces of the stud and component opposite one another begin to melt as a result of the high welding current. Then the stud is lowered onto the component again so that the two melts combine. The welding current is switched off upon contact with the component and short-circuiting of the arc, or shortly beforehand. All the molten material solidifies, and the weld connection is established.

Then the holding device is removed from the welded stud. If the holding device has two elastically preloaded jaws laterally gripping the stud shank, removal can be accomplished in that the fastening tool is rotated on the carrier, so the holding device is pulled away laterally, so to speak. During the actual fastening process, the feed mechanism can make ready an additional element, which then will be picked up during the movement of the fastening system head to a next weld point by rotating the fastening tool toward the transfer station.

SUMMARY

Based on this prior art, the object of the present invention is to specify an improved fastening system head, an improved fastening system, and an improved method for fastening elements. This object is attained in the fastening system head mentioned above according to a first aspect of the present invention in that at least one additional feed mechanism is provided on the fastening system head, by which means elements can be fed to the fastening tool. As a result of this measure, it is possible to feed different types of elements to the fastening system head. In this way, the flexibility of the fastening system head is increased. The object is thus attained in full.

In general, it is possible for the additional feed mechanism to be provided as a "reserve feed mechanism." However, it is especially preferred for the additional feed mechanism to be designed to feed a different type of elements from the first feed mechanism. In this way, different types of elements can be fastened with the same fastening system head during an overall process, for example shorter and longer elements, or thicker and thinner elements, elements made of different materials, etc.

Furthermore, in the case of the fastening system head according to the first aspect of the present invention, it is preferred for the feed mechanisms to each have a transfer station at which an element is readied for transfer to the fastening tool. The transfer stations, which preferably are mounted on the carrier, each make ready one element at a time. The fastening tool can take from a transfer station a suitable element, depending on the fastening operation to follow, in order to carry out a fastening operation therewith. It is of particular advantage for the transfer stations to be arranged in a circle whose center is defined by the axis of rotation. This arrangement makes advantageous use of the fact that the fastening tool is rotatable about the axis of rotation. Accordingly, the transfer stations in this embodiment can be arranged essentially fixed in place with respect to the carrier. The result is a structure of simple design.

According to another preferred embodiment, the first transfer station and the additional transfer station are affixed to the carrier in different orientations. Since transfer stations often are irregular in cross-section (for example, the height is different from the width), this measure can achieve the result that the fastening system head retains a compact configuration despite the additional feed mechanism.

Even though it is generally possible to arrange the transfer stations to be distributed over the fastening system head, it is nevertheless preferred for the transfer stations to be arranged side by side. By this means, the transfer stations can be concentrated in one location, which also simplifies connection to a stationary unit whence the elements are fed.

According to another preferred embodiment, the transfer stations are arranged on a transfer block, which is movable between at least two transfer positions with respect to the carrier. In this embodiment, the location where the fastening tool picks up one element at a time is always the same location. By moving the transfer block, however, a different transfer station is positioned at this location in each case, and consequently a different element is made ready, if applicable. In this context, it is particularly preferred for the transfer block to be movable in a direction parallel to the axis of rotation with respect to a circular path coaxial to the axis of rotation. This generally permits a favorable design for the support of the transfer block on the carrier.

In another preferred embodiment, the transfer block is movable in a tangential direction with respect to a circular path coaxial to the axis of rotation. This results in a more compact cross-section of the fastening system head in the direction of the axis of rotation. The aforementioned object of the invention is attained according to a second aspect of the present invention in the aforementioned fastening system head in that the feed mechanism has a transfer station at which an element is made ready for transfer to the fastening tool, and in that a test device is provided which tests an element readied at the transfer station for usability.

This measure, in contrast to that described in the patent document DE 102 23 154 A1, does not test merely whether or not an element is readied at the transfer station. Rather, the test device is also used to test whether this element is one that is also suitable or usable for the subsequent fastening operation. The advantage of such a test device consists in that faulty elements (e.g. elements that are defective, or elements of the wrong type that are inadvertently supplied in bulk material) can be removed before a fastening operation is performed with such a faulty element. Since an element is taken by the fastening tool at the transfer station in the inventive fastening system head, it is also possible to separate out (discard) such a defective element in a simple manner and ready ("reload") a new element by means of the feed mechanism, said new element then being used for the subsequent fastening operation. The object is thus also attained in full for the second aspect of the invention.

It is of particular advantage for the test device to inspect at least one dimension of the element. Because the element is made ready at the transfer station, inspection of one dimension is possible in a relatively simple way. As a result, faulty elements with the wrong dimension can be separated out by the test device. In this context, it is particularly advantageous for the element to have a shank and for the test device to inspect the length of the shank.

Another preferred embodiment provides for the element to have a shank and for the test device to inspect the diameter of the shank. In general, it is of course also possible for the test device to inspect the diameter and/or the length of a head of an element having a shank and a head. On the whole, it is additionally advantageous for the test device to have at least one sensor for sensing a dimension of the component, wherein the sensor is integrated in the fastening tool.

In this embodiment, the inspection can in a manner of speaking be carried out by the fastening tool, which is to say when the fastening tool takes the element from the transfer station. In this regard, it is particularly advantageous for the at least one sensor to sense a movement of the holding device with respect to the fastening tool. This embodiment permits an inspection of a shank length, in particular.

According to another preferred embodiment, the at least one sensor senses a movement of a member such as a holding jaw relative to a housing of the holding device. In this embodiment, it is possible by comparatively simple design means to sense a diameter, in particular, of a gripped shank or the like. It is advantageous overall for the dimension of the element to be determined indirectly through the travel of members of the fastening tool that are moved when gripping the element.

According to another preferred embodiment, the holding device in this context has at least one movable holding member for holding an element, wherein the test device has at least one displacement measuring device to measure the distance traveled by the holding member.

According to another preferred embodiment, the test device additionally has a sensor to sense the surface of the element. This makes it possible, for example, to separate elements with the same dimensions, but different surfaces (for example because of different materials). The object specified above is further attained by a fastening system having a robot that is movable in at least two coordinate axes, and having a fastening system head of the inventive type affixed to the robot. In this fastening system, it is especially preferred for a control unit to be provided that can be used to control the course of a fastening operation, wherein the control unit has a memory in which are stored element data concerning the fastening operation, these data characterizing the element to be fastened to a component in the fastening operation, and also has transmission means in order to drive the fastening system head on the basis of the element data so as to ensure that the correct element is fastened to the component.

In corresponding fashion, the above object is attained by a method for fastening an element to a component, wherein a fastening tool is rotated on a carrier in order to pick up an element at a transfer station arranged on the carrier, and wherein the fastening tool is subsequently rotated together with the element into a fastening position in order to fasten the element to the component, wherein element data concerning the fastening operation are stored in a memory, these data characterizing the element to be fastened to the component during the fastening operation, wherein during transfer of an element from the transfer station, said element is inspected as to whether it conforms to the element data, and wherein said element is rejected if it does not conform to the element data. In this way, it is possible to ensure that a (frequently irreversible) attachment between the element and a component is only made when it is guaranteed that the element is in fact the element intended for this fastening operation. The object is thus attained in full.

Of course, the features mentioned above and those to be explained below need not be used only in the specific combinations given, but may also be used in other combinations or alone without departing from the scope of the present invention.

DRAWINGS

Figure 5:
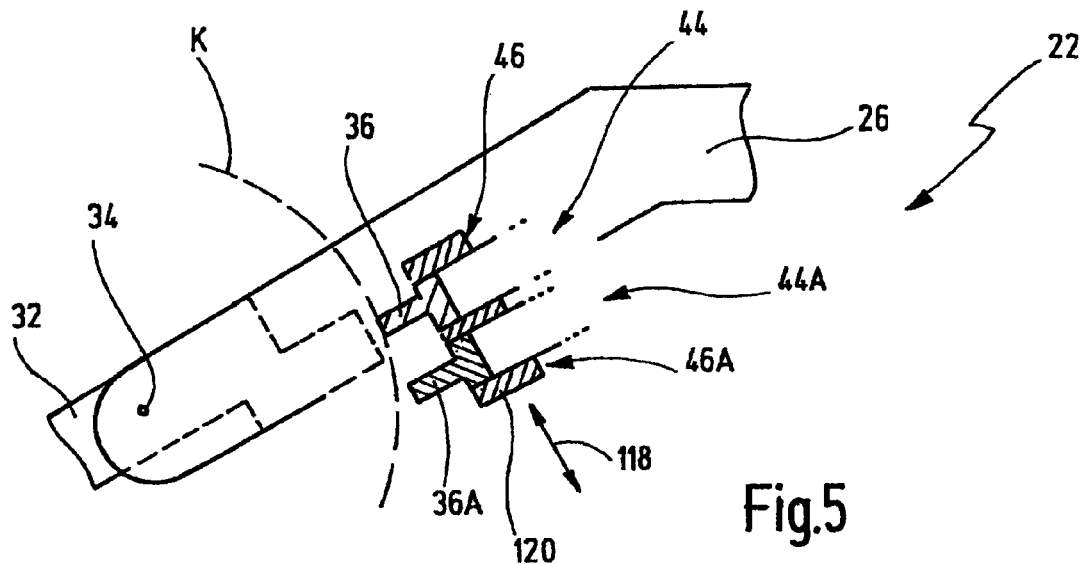
Figure 6:
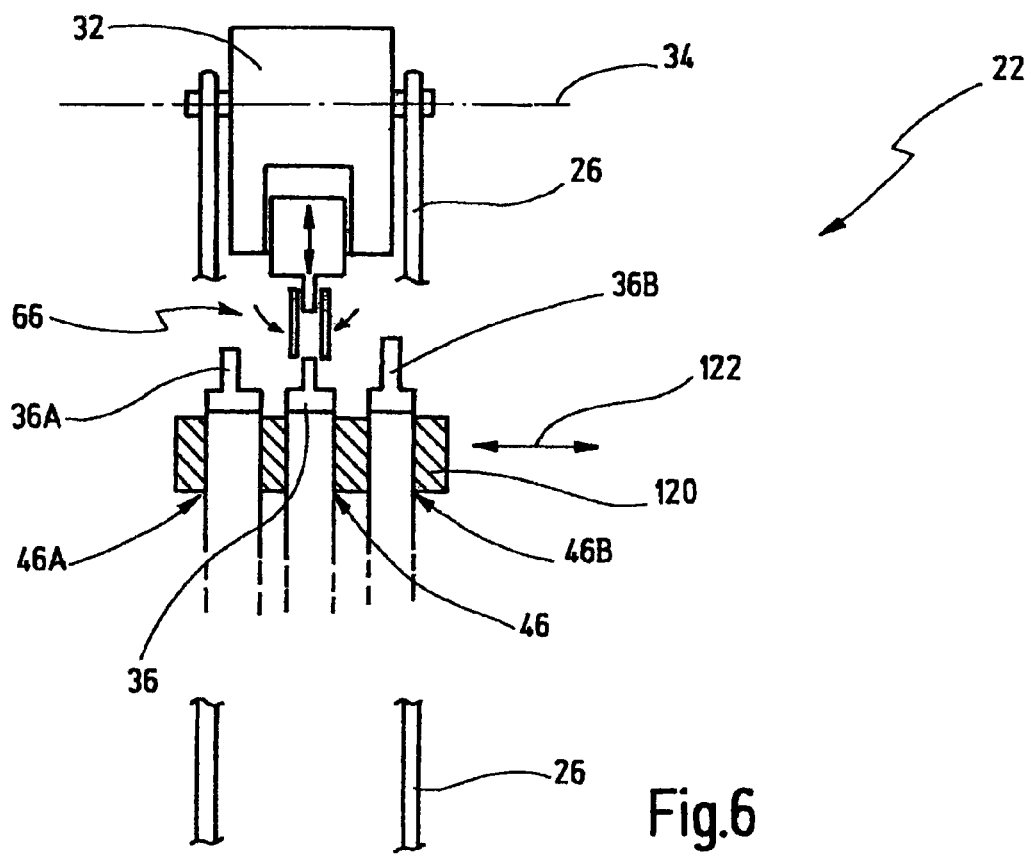
Figure 7:
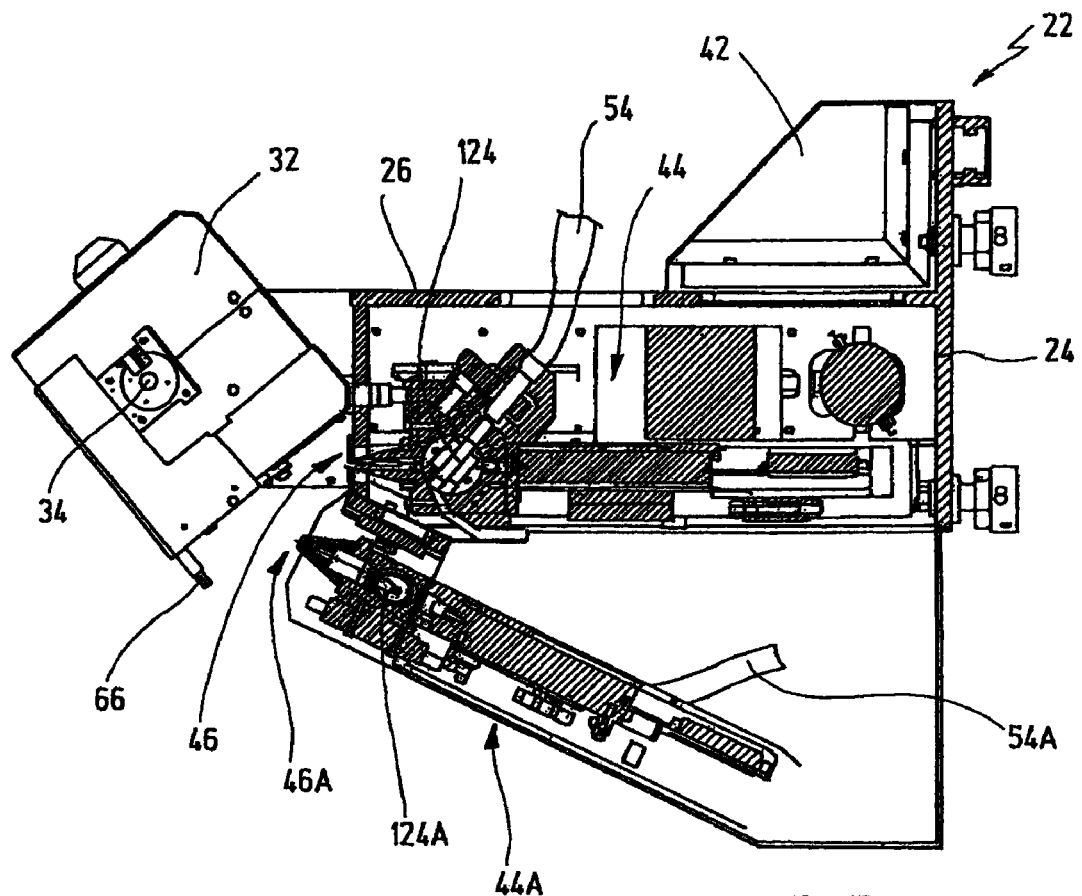
Figure 8:
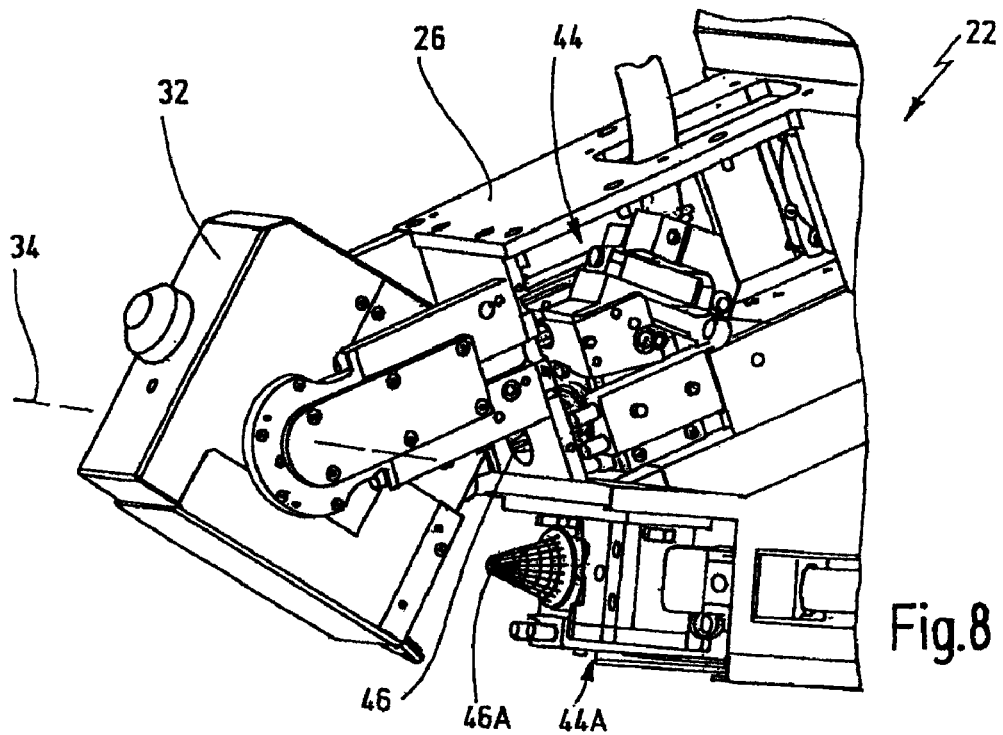
Figure 9:
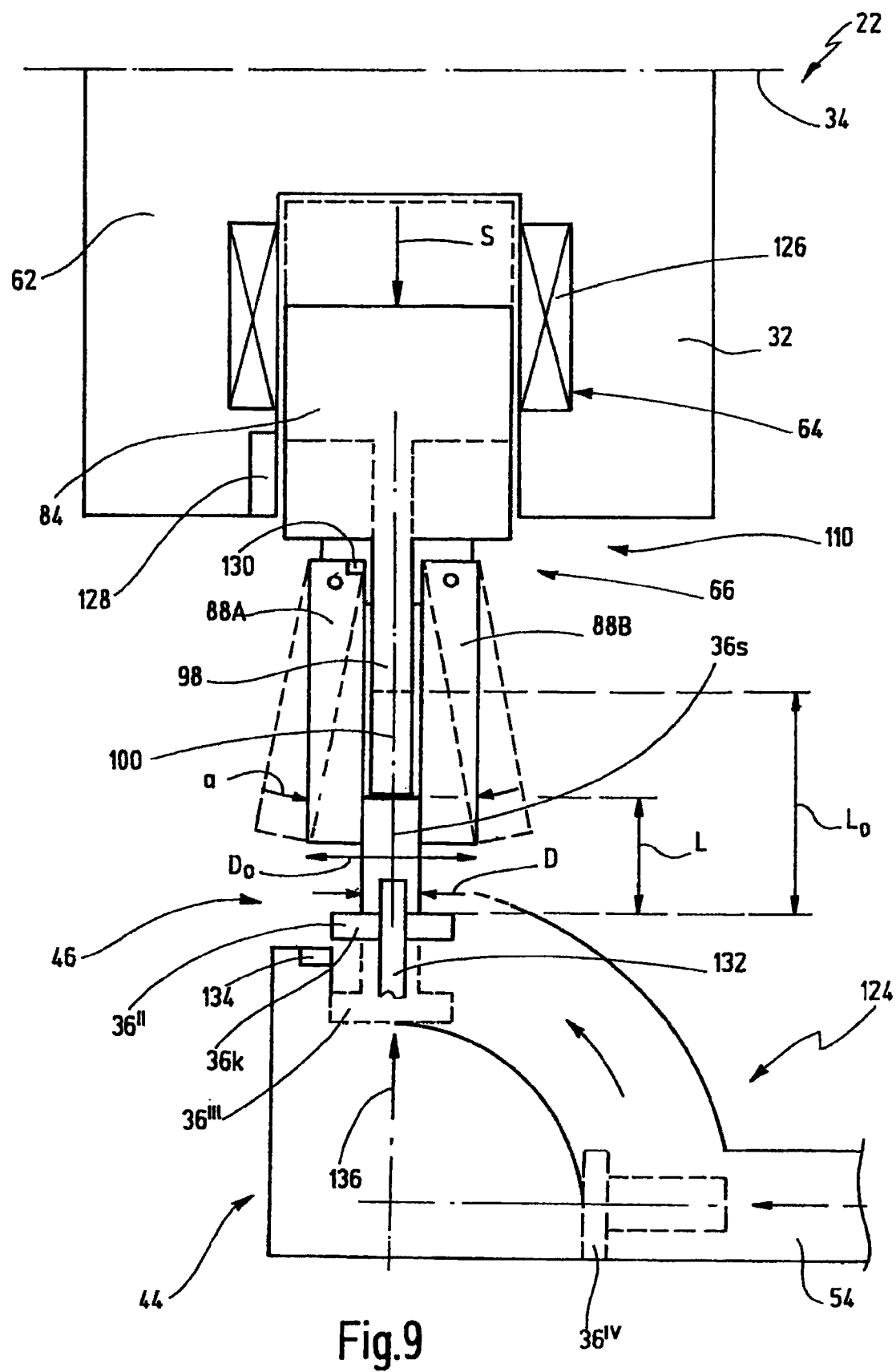

Example embodiments of the invention are shown in the drawings and are explained in detail in the description below. They show:

FIG. 1 is a schematic view of an inventive fastening system;
FIG. 2 is an alternative embodiment of an inventive fastening system head;
FIG. 3 is a longitudinal section through an embodiment of a holding device;
FIG. 4 is a cross-section along line IV-IV from FIG. 3;
FIG. 5 is a schematic side view of a detail of an alternative embodiment of an inventive fastening system head;
FIG. 6 is a schematic top view of another alternative embodiment of an inventive fastening system head;
FIG. 7 is a longitudinal section through another embodiment of an inventive fastening system head;
FIG. 8 is a perspective view of the fastening system head from FIG. 7; and
FIG. 9 is a schematic representation of a fastening system head according to another alternative embodiment of the invention.

DETAILED DESCRIPTION

In FIG. 1, an inventive fastening system is designated 10 overall. The fastening tool 10 has a robot 12. The robot 12 includes a stationary base 14, from which extend two arms 16, 18 that are articulated to one another. A flange 20 is provided at the end of the arm 18. Affixed to the flange 20 is a fastening system head, which is designated 22 overall in FIG. 1.

The fastening system head 22 has a base plate 24, which is affixed to the flange 20. An elongated carrier 26 extends from the base plate 24. The elongated carrier 26 has a first, short support section 28, and an adjoining second, elongated support section 30. The second support section 30 is inclined at an angle α of 120° with respect to the first support section 28. The angle α is preferably between 60° and 80° or between 100° and 120°. In general, however, it is also possible for the first support section 28 and the second support section 30 to be aligned on the same axis. The axis of the second support section 30 is labeled 27 in FIG. 1.

At the end of the second support section 30, a fastening tool 32 is mounted such that it is rotatable about an axis of rotation 34. The axis of rotation 34 extends perpendicular to the axis 27 of the second support section 30, and in the embodiment shown is aligned approximately parallel to the base plate 24. The fastening tool 32 serves to fasten, in particular to weld, an element, in particular a welding stud 36, to a component, in particular a metal sheet 38.

In terms of design, the fastening system may be used for a plurality of fastening types, but an embodiment of the fastening system as a stud welding system or short-cycle arc welding system with drawn arc ignition is especially preferred. Hence, in the following the fastening system is called a stud welding system and the fastening system head 22 is called a stud welding head, but with no detriment to general applicability. The fastening tool 32 is called the welding tool 32. In a linear motion (fastening direction 40), the welding tool 32 welds the stud 36 to the component 38.

The welding head 22 additionally has a control unit 42. The control unit 42 is provided at the initial region of the elongated carrier 26 and in the embodiment shown is mounted on the first support section 28, namely next to the base plate 24. The control unit 42 serves to drive the fastening tool 32 and serves as an interface to higher-level control devices.

The welding head 22 additionally has a feed mechanism 44. The feed mechanism 44 takes studs 36 from a feeder tube and holds them ready with the shank forward at a transfer station 46. The feed mechanism 44 is designed, for example, essentially as a hose or tube and extends along the elongated carrier 26. The transfer station 46 is preferably located in a central region of the second support section 30. One stud 36 at a time is made ready in this station for transfer to the welding tool 32. This stud is labeled 36" in FIG. 1.

The welding head 22 additionally has another feed mechanism 44A. The feed mechanism 44A takes studs 36A from a feeder tube and holds them ready with the shank forward at an additional transfer station 46A. The additional feed mechanism 44A can be essentially identical in design to the feed mechanism 44. The feed mechanism 44 and the feed mechanism 44A are located next to one another on a circle K, which is concentric to the center point of the axis of rotation 34. This measure makes it possible for the fastening tool 32 to be able to obtain studs from the feed mechanism 44 as well as from the feed mechanism 44A without further design changes.

In this context, it is possible for studs of one type to be taken from the first feed mechanism 44 and also for studs 36A of the second type to be taken from the additional feed mechanism 44A in a predefined sequence of fastening operations. Consequently, the fastening system 10 as a whole can operate with significantly greater flexibility. In particular, no conversion is necessary from one stud type to another stud type, such as is the case when only one feed mechanism 44 is provided.

The welding system 10 additionally has a stationary base station 50. The purpose of the base station 50 is to supply the welding head 22 with power for welding, and it also serves as a higher-level control device. The base station 50 is connected to a singling device 52. The purpose of the singling device 52 is to single studs 36, which generally are supplied as bulk items, and to convey them individually through a tube 54 to the feed mechanism 44. To this end, the singling device 52 generally has a compressed air unit in order to be able to convey the elements 36 pneumatically. In the present case, the singling device 52 is also designed to single studs 36A of an additional type, which also may be supplied as bulk items, and to convey them through an additional tube 44A [sic] to the additional feed mechanism 44A.

Also shown in FIG. 1 is a line 56, which connects the base station 50 to the welding head 22. The line 56 is generally implemented as a system of lines, and includes lines for carrying the welding current, control lines, etc. Also shown in FIG. 1 is a line 58, which connects the welding head 22 to the base 14 of the robot 12. The line 58 is optional, and includes one or more control lines. By means of the control lines 58, the movements of the robot 12 can be coordinated with those of the welding tool 32.

Alternatively, or in addition, the base 14 of the robot 12 is connected by a line 60 to the base station 50. Accordingly, it is also possible for the coordination between robot 12 and welding head 22 to be accomplished through the lines 60, 56. The lines 56, 58 are routed to the control unit 42, whence some of them are passed through to the welding tool 32 (to supply power to the equipment there) and some of them are used directly.

The welding tool 32 has a housing 62, which is rotatably mounted on the axis of rotation 34. Provided on the housing 62 is a fastening drive device 64 in the form of a linear motor 64. The purpose of the linear motor 64 is to move a holding device 66, which projects from the housing 62 for holding one stud at a time, perpendicular to the axis of rotation 34. Consequently, the linear motor 64 constitutes a linear motion device to carry out the raising and lowering motions within the framework of a stud welding operation as described further above.

In addition, on the end region of the second support section 30 is provided a rotary drive 68, whose purpose is to rotate the welding tool 32 to any desired angular position relative to the second support section 30 in a controlled manner. The range of rotation is typically at least 270°, generally 360°. One purpose of the rotary drive 68 is to rotate the welding tool 32 into a suitable welding position in each case, of which one such position is indicated by solid lines in FIG. 1. An alternative welding position is indicated by dot-and-dash lines at 32'. In the additional welding position, the welding tool 32' is used to weld a stud 36' to a component (not shown) along a welding direction 40'.

In addition, the rotary drive 68 serves as a loading drive device. To this end, the welding tool 32 is rotated into a position 32", which is shown in dashed lines in FIG. 1. In this position, the holding device 66" is aligned with the transfer station 46 and can grip a stud 36" held ready there, taking it for a subsequent welding operation. By means of the rotary drive 68, the welding tool 32 can also be rotated into an additional position (not shown) in which the holding device is aligned with the additional transfer station 46A, in order to grip a stud 36A held ready there and use it for a subsequent welding operation.

Even though the loading drive device in the embodiment shown is composed solely of the rotary drive 68, for example an electric motor, variants of this are also possible. Thus, for instance, the loading drive device can be implemented in that the welding tool 32 on the carrier 26 is moved in the longitudinal direction, to name just one example. Of course, the transfer stations 46, 46A would then have to be arranged at another location accordingly.

It is easy to see that the welding tool 32 can be designed with very small dimensions. On the one hand, the welding tool 32 is spatially separated from the control unit 42. On the other hand, the welding tool 32 is decoupled from the pneumatic stud feeding mechanism. This means that there is no need to flange-mount any pneumatic or hydraulic lines to the welding tool 32. The electrical supply to the linear motor 64 and/or to the rotary drive 68 is relatively easy to implement. The same applies to the actuator for the holding device 66, if this device is actively actuated electrically.

As a result of the fact that the studs 36 are placed in the holding device 66 from the front instead of from the back, no loading pin is needed as in the prior art. Consequently, the welding tool 32 can be made short in the axial direction 40. It is a matter of course that a combination of a spring and a solenoid may also be provided as the fastening drive device 64 instead of a linear motor. It is furthermore a matter of course that the rotary drive 68 may be designed as an electric stepper motor with a precision of <1°, even better a precision of 0.5°.

The parameter specifications for the rotary motion relate to both the welding program and to the robot motion program. Each welding position has its own welding program and its own robot motion program. The relationship of the parameter data to the individual welding and robot motion programs ensures that, firstly, the stud 36 is always perpendicular to the surface of the component 38, and secondly that the welding tool 32 is in a position during robot motion that gives the robot the greatest possible freedom of motion on the path to the welding position. The rotary motion of the welding tool 32 can be controlled by the base station 50 and/or by the base 14 of the robot 12.

The angled arrangement of the second support section 30 with respect to the first support section 28 provides improved freedom from interfering edges. In addition, the feed mechanisms 44, 44A are easier to implement, since the studs, as shown, can be held at the transfer station 46 by gravity and/or compressed air.

It is also shown in FIG. 1 that the component 38 is designed as an angled component with a relatively small opening 70. Viewed from the robot 12, the desired welding position is located inside a cavity 72. It is easily apparent that the inventive stud welding system 10 is especially well suited to carrying out this task. In order to insert the second support section 30 through the opening 70, the welding tool 32 can be rotated into a position in which it is largely in alignment with the second support section 30, for example the position 32" in FIG. 1.

After insertion into the cavity 72, the welding tool 32 is rotated into the welding position shown with solid lines. Beforehand, a stud 36 has been taken from the transfer station 46 or 46A and is thus located in the holding device 66. Next, a stud welding operation is carried out in a manner that is conventional per se, as was described in the introduction.

As will be explained in detail further below, the holding device 66 is preferably designed such that it can release the welded stud 36 in a direction transverse to the welding direction 40. Accordingly, it is possible in preferred fashion to rotate the fastening tool 32 back to the aligned position 32" immediately after the welding without the second support section 30 having to execute a backward movement in the welding direction 40. As soon as the aligned position 32" is reached, the second support section 30 can be withdrawn through the opening 70 again. The robot 12 then carries the welding head 22 to the next welding position. For the robot 12, the axis of rotation 34 constitutes an additional robot axis of rotation. Consequently, positioning at a welding position can be accomplished more simply. This is all the more true since the additional axis of rotation is located close to the welding position.

A further advantage of the inventive welding system 10 results as follows. In the prior art, the welding head as a whole was susceptible to projecting edges. For this reason, pneumatic valves were not provided on the welding head in the prior art. However, this necessitated very complicated cabling between the base station 50 and the welding head 22.

Due to the spatial separation of the control unit 42 and the welding tool 32 on the welding head 22, the control unit 42 itself is not susceptible to projecting edges. Consequently, valves can be integrated in the control unit 42 at the welding head 22, so that the number and complexity of the supply lines can be reduced. Since the control unit 42 is provided on the welding head 22, no complicated electrical cabling is required between the welding head 22 and the base station 50. For example, it is possible that the supply lines 56 in a cable assembly include only one welding cable, two auxiliary supply voltages for the linear motor, and a 24-volt supply for the control unit, two fiber optic lines for serial transmission of control and measurement data, and the feeder tubes 54, 54A. In an expanded version, the cable assembly could also be augmented by a protective gas feed line or a pressure/vacuum line, for example for paint marking. As a result, the cable assembly can be less heavy, less torsionally stiff, and consequently more reliable. Furthermore, the decoupling of the feed mechanisms 44, 44A and the welding tool 32 makes it possible for the studs 36 (or 36A) to be fed to the transfer station 46 in parallel to the stud welding process.

In the prior art, stud feeding and stud welding take place in a strictly serial fashion. This is why cycle times<1 sec can only be achieved with great difficulty and under special boundary conditions.

In accordance with the invention, immediately after a stud is taken from the transfer station 46 or 46A to initiate a stud welding operation, an additional stud can be conveyed from the singling device 52 through the tube 54 or 54A and the feed mechanism 44 or 44A to the transfer station 46 or 46A. This can take place while the welding tool 32 is carrying out a stud welding operation. In addition, the welding tool 32 can be pivoted to the transfer station 46 or 46A and then pivoted into the correct situation for the new weld position during the movement of the carrier 26 from one weld position to the next. This parallelism also contributes to the overall result of achieving welding cycles of significantly less than 1 sec.

Despite the fact that any desired shapes may in principle be considered as elements to be welded, nevertheless, elements that can be fed by means of compressed air, in particular rotationally symmetrical elements, are especially suitable for being processed with the inventive fastening system. The additional welding position 32' can, for example, be an overhead position, such as the position 32' shown. This can be achieved without the need to rotate the carrier 26. In this way, stresses on the supply cables and feeder tubes are avoided.

Also shown in FIG. 1 is that a test device 110 is provided on the fastening tool 32. The test device 110 serves to test whether an element 36, 36A readied at one of the transfer stations 46, 46A is suitable or usable for the subsequent welding operation. When a stud is being taken from a transfer station 46, 46A, the test device 110 tests the usability of the stud 36, 36A taken, and uses the stud if it is suitable. If the stud should be unusable for some reason (for example, a faulty element in a batch of bulk items), this unusable element is rejected (for example, by opening the holding device and dropping the faulty element), and a new element is reloaded.

The test device 110 has sensors for the specified purpose; these sensors detect the characteristics of the element made ready in each case, and compare it with element data that characterize the element to be used for the next welding operation. Such element data can be stored in a memory of the control unit 42, as is shown schematically by 112 in FIG. 1. It is also possible to store such element data in a memory of the base station 50, as is schematically shown by 114. The use of a test device 110 is also possible in a fastening system 10 of the type in which only a single feed mechanism 44 is present.

In the description below of details and variations of the fastening system shown in FIG. 1, identical and similar features are labeled with the same reference numbers. In general, when labeling is identical, identical or similar functionality is to be assumed unless expressly noted otherwise below. When individual features of the fastening system are explained, it is to be assumed that the function is otherwise identical or similar to the function of the fastening system 10 from FIG. 1. Furthermore, it is understood that the following references to welding systems, welding heads, or welding tools are meant to refer to such features for fastening in general, for example to riveting or adhesive bonding processes.

In FIG. 2, an alternative embodiment of a welding head 22 is shown. In contrast to the welding head 22 from FIG. 1, a rotary drive 68' for rotating the welding tool 32 is not provided in the end region of the second support section 30, but instead is provided in the region of the control unit 42. The rotary motions of the rotary drive 68' are transmitted to the welding tool 32 by means of a belt drive 80. The belt drive 80 runs along the elongated carrier 26. In the representation of FIG. 2, the elongated carrier 26 is composed of two parallel arms, with the welding tool 32 rotatably mounted between the end regions thereof.

An embodiment of a holding device 66 is shown in FIGS. 3 and 4. The holding device 66 has a housing 84, which has an opening 86 facing downward in the fastening direction 40. The holding device 66 has two jaws 88A, 88B mounted on the housing 84 such that they can pivot to a limited extent; said jaws are made of an essentially inelastic material. The jaws 88A, 88B constitute a chuck in that an element 36 can be clamped between the ends of the jaws 88A, 88B, for example with a predetermined force.

Each of the jaws 88A, 88B is connected as a single piece with a lever section 92A, 92B. The lever sections 92A, 92B extend in the opposite direction with respect to shafts 90A, 90B, on which the jaws 88A, 88B are mounted. In this context, the lever sections 92A, 92B are angled away with respect to the fastening direction 40 such that they intersect one another. As a result of pressure on the lever sections 92A, 92B from above (in the depiction in FIG. 3), the jaws 88A, 88B are thus moved away from one another in order to release the stud 36. This is shown in FIG. 3 for the jaw 88A. It can be seen that the jaw 88A fully releases the stud 36 in the direction transverse to the fastening direction 40 (which is to say out of the plane of the page in FIG. 3). Accordingly, with open jaws 88A, 88B the holding device 66 can be moved transverse to the fastening direction 40 and perpendicular to the plane of the jaws 88A, 88B without touching the stud 36. The direction of movement of the jaws 88A, 88B during this process is labeled 93 in FIG. 4.

To actuate the lever sections 92A, 92B, an actuator 94 is provided, which preferably is electrically driven. The actuator 94 actively opens and closes the jaws 88A, 88B. Of course, the actuator 94 should be designed as a bidirectional drive for this purpose. The active actuation of the jaws 88A, 88B has the advantage that the stud 36 can be held with a defined force (e.g., 20 N). The derivation of the clamping force from the elasticity of the individual fingers of the chuck, as in the prior art, is rendered unnecessary. Consequently, a significantly longer service life can be achieved. The direction of actuation of the actuator 94 is labeled 96 in FIG. 3. The ends of the jaws 88A, 88B are shaped in such a way that they can securely grip the studs 36 in question. To this end, it can be useful to place suitable headpieces on the jaws 88A, 88B, which may be adapted to different studs 36.

Extending from the underside of the housing 84, as shown in FIG. 3, is a positioning pin 98. The positioning pin or stop pin 98 is rigidly attached to the housing 84. Its purpose is to ensure, during transfer of a stud 36 from the transfer station 46 or 46A, that the stud 36 assumes a defined position relative to the holding device 66, and it also serves as a stop in order to absorb the axial force during welding.

The bidirectional active actuator can take the form of a pneumatic or hydraulic drive. However, it is preferably implemented by a combination of two electromagnets or by an unregulated linear motor of the "moving coil" or "moving permanent magnet" design. Furthermore, it is possible to design the actuator 94 to be semi-active. In this design, opening of the jaws 88A, 88B is accomplished by an electromagnet, for example. When the electromagnet is shut off, suitably arranged springs ensure that a stud 36 is gripped by the jaws 88A, 88B with a defined force.

For welding, the jaws 88A and/or 88B are supplied with welding current that is conducted to the stud 36. The defined force makes for reliable, low-wear current transfer. For this reason, it is self-evident that the jaws 88A, 88B are made of a conductive metal. In contrast, the positioning pin 98 should be designed to be nonconductive or insulated with respect to the housing 84.

As an alternative to an active or semi-active holding device 66, it is also possible to provide jaws that are elastic in design and permit lateral introduction of the stud 36 between them (along the direction 93), and which, when moved transverse to a welded stud 36, release said stud without a significant application of force. The longitudinal axis of the holding device 66 is labeled 100 in FIG. 3.

FIGS. 5 through 8 show alternative embodiments of fastening system heads 22. These embodiments correspond to the embodiments in FIGS. 1 through 4 with regard to structure and function unless otherwise indicated. For this reason, like or similar elements are labeled with like reference numbers.

Shown in FIG. 5 is a fastening system head 22 that has a first feed mechanism 44 and a second feed mechanism 44A. The transfer stations 46, 46A of the two feed mechanisms are arranged side by side, namely on a shared transfer block 120. The transfer block 120 is mounted such that it is movable in the tangential direction 118 with respect to a circle K whose center point coincides with the axis of rotation 34. In FIG. 5, the transfer block 120 is in a position in which the fastening tool 32 can take a stud 36 from the transfer station 46. When the transfer block 120 is moved in the tangential direction 118, the transfer station 46A takes the position that is occupied by the transfer station 46 in FIG. 5. Then the fastening tool 32 can take a stud 36A from the transfer station 46A.

FIG. 6 shows another alternative embodiment of a fastening system head 22. In this embodiment, three feed mechanisms with a first transfer station 46, a second transfer station 46A, and a third transfer station 46B are provided by way of example. The three transfer stations 46, 46A, 46B are provided on a shared transfer block 120. In the embodiment shown in FIG. 6, the transfer block 120 is mounted such that it is movable in a direction 122, which extends parallel to the axis of rotation 34.

In the representation shown in FIG. 6, the transfer station 46 is located in a position in which the holding device 66 of the fastening tool 32 can take a stud 36. Moving the transfer block 120 to the left or right in the direction of movement 122 allows the holding device 66 to take either a stud 36A from the transfer station 46A, or a stud 36B from the transfer station 46B, alternatively. In addition, it is schematically shown in FIG. 6 that the studs 36, 36A, 36B each have a different shank length.

FIGS. 7 and 8 show another embodiment of an inventive fastening system head 22. In the case of the fastening system head 22 from FIGS. 7 and 8, a first transfer station 46 and a second transfer station 46A are arranged next to one another on a circle that is concentric to the axis of rotation 34, in similar fashion to the embodiment from FIG. 1. Also visible in FIG. 7 is that the feed mechanisms 44, 44A each have a rotary mechanism 124 or 124A.

In a rotary mechanism of this nature, studs that have a head and a shank are rotated. By this means, studs can be conveyed head first through a feeder tube 54, 54A to the rotary mechanism 124, where they are then rotated. As a result, at the transfer station 46 the studs can be readied for transfer to the fastening tool 32 with the shank first.

It is evident in FIG. 7 that the feed mechanism 44 occupies a certain angular region in the circumferential direction about the axis of rotation 34; said angular region can be in the range from 10° to 30°, for example. Normally, the additional feed mechanism 44A would cause this angular region to double. However, in the fastening system head 22 in FIG. 7, the feed mechanisms 44, 44A are attached to the carrier 26 in different orientations. Speaking more precisely, the feed mechanism 44A is rotated by 90° about its longitudinal axis for attachment to the carrier 26. While the feed mechanism 44 is shown from the side in a longitudinal section in FIG. 7, the feed mechanism 44A in FIG. 7 is shown as a longitudinal section from above. As a result, the angular region is smaller. However, the general mode of operation of the two feed mechanisms 44, 44A is preferably identical.

In FIG. 9, another embodiment of a fastening system head is shown in schematic form. The fastening system head 22 from FIG. 9 has a test device 110, which is designed to inspect a stud 36" made ready at a transfer station 46 for usability. In particular, the test device 110 inspects the length L and the diameter D of the shank 36s [sic] of a readied stud 36".

It is first evident in FIG. 9 that the holding device 66 has a housing 84, which is movable in the axial direction (axis 100) with respect to a housing 62 of the fastening tool 32, specifically by means of a fastening drive device 64 in the form of a linear motor. The linear motor is schematically indicated in FIG. 9 by 126. Shown at 128, in addition, is a displacement sensor 128 integrated in the fastening tool 32. The displacement sensor 128 measures the distance traveled by the housing 84 of the holding device 66 with respect to the housing 62.

The holding device 66 has, in similar fashion to the holding device 66 shown in FIG. 3, a first and a second jaw 88A, 88B, which can be moved toward and away from one another in order to grip or release a stud 36. In addition, the holding device 66 has a positioning pin 98 that, when a stud 36" is gripped, rests against the free end face of the shank 36s of the stud. Prior to taking a stud 36" from the transfer station 46, the housing 84 is in a base position, which in FIG. 9 is shown in dashed lines. In addition, the two jaws 88A, 88B are likewise in a base position in their opened state, which in FIG. 9 is likewise shown in dashed lines.

In order to grip the stud 36", the housing 84 of the holding device 66 is moved out of the housing 62 of the fastening tool 32, namely far enough that the positioning pin 98 strikes the free end of the shank 36s of the stud. This is shown in FIG. 9, with the housing 84 of the holding device 66 having traveled a distance S. At the transfer station 46, the stud 36" is always held in a defined position such that the head 36k of the stud always assumes a base position. For this reason, the path between the free end of the positioning pin 98 in the base position (dashed in FIG. 9) and the head 36k is a fixed, unchangeable distance $L_0$. The length L of the shank 36s can be determined by means of the displacement sensor 128 in that the measured distance S traveled is subtracted from the fixed predetermined distance $L_0$ ($L = L_0 - S$).

In the transfer station 46, the stud 36" is held by means of a schematically indicated chuck 132. The chuck 132 can likewise have two jaws, or can have a plurality of jaw-like struts that taper conically together, as shown in the corresponding transfer stations 46, 46A in FIGS. 7 and 8. Once the positioning pin 98 has come into contact with the free end of the shank 36s, the jaws 88A, 88B are moved together out of the rest position until they contact the shank 36s. In so doing, the jaws 88A, 88B each travel a distance a.

Moreover, the distance between the interior sides of the two jaws 88A, 88B in the rest position (shown in dashed lines) is an unchangeable quantity, which in FIG. 9 is labeled $D_0$. The diameter D of the shank 36s is thus calculated essentially using the formula $D = D_0 - 2a$.

Also shown in FIG. 9 is a surface sensor 134, which can be arranged in the region of the transfer station 46, for example, and which senses the surface of a readied stud 36". By this means, studs of different materials can be recognized, for example.

Of course, if desired the test device 110 can also inspect only the length L of the shank 36s, only the diameter D of the shank 36s, or only the surface of the stud 36". In addition, it is also possible to inspect dimensions of the head 36k of the stud 36", for example in the event of an appropriately designed chuck 132.

In any case, the sensed data are compared with element data that are stored in a memory 112 or 114 (c.f. FIG. 1). If deviations are detected, a readied stud 36" is rejected. Only if the element data agree with the measured data is the readied and taken stud 36" used for a subsequent welding operation.

It is also shown in FIG. 9 that the studs can be conveyed through the tube 54 with the heads forward. In this case, the studs first encounter a rotary mechanism 124, such as the one labeled $36^{IV}$ in FIG. 9. Then the studs are rotated 90°, into a position labeled 36''' in FIG. 9. Then, the studs are pushed into the chuck 132, as indicated by an arrow 136, namely in the transfer position 36" shown with solid lines in FIG. 9. Conveyance through the tube 54 with the head forward makes it possible to prevent, in particular, a canting or jamming of studs in the tube or the feed mechanism 44.

Of course, a test device 110 can be provided not only in fastening system heads 22 with multiple feed mechanisms 44, 44A, but also in fastening system heads 22 that have only one feed mechanism 44. Correspondingly, multiple feed mechanisms 44, 44A, can also be provided on a fastening system head 22 without a test device 110 being provided. Preferably, however, these two aspects of the present invention are combined with one another.

What is claimed is:

1. A method for fastening an element to a component using a fastening tool, a carrier, and a transfer station, the method comprising:
   incorporating a test device on a fastening system head of the fastening tool;
   rotating the fastening tool together with the test device on the carrier to the transfer station;
   capturing an element prepositioned at the transfer station using the fastening tool;
   moving both the fastening tool and the element to a fastening position;
   fastening the element to the component in a fastening operation;
   storing element data characterizing the element in a memory; and
   inspecting the element during the moving operation using the test device for conformance to the element data.

2. The method of claim 1, further comprising:
   rejecting the element by opening the fastening tool if it does not conform to the element data; and
   reloading a new element at the transfer station.

3. The method of claim 1, further comprising rotatably connecting the fastening tool together with the test device to the carrier.

4. The method of claim 1, further comprising positioning the transfer station on the carrier.

5. A method for fastening one of a first and a second element to a component using a fastening tool rotatably coupled to a carrier, and first and second element transfer stations, the method comprising:
   storing element data characterizing the first and second elements in a memory;
   predesignating a first one of the transfer stations to receive the first element and a second one of the transfer stations to receive the second element;
   identifying one of the first and second elements as a selected element using the stored element data;
   rotating the fastening tool on the carrier to one of the first and second transfer stations having the selected element;
   capturing the selected element using the fastening tool; and
   inspecting the element using a test device incorporated in the fastening tool for conformance to the element data.

6. The method of claim 5, further comprising:
   moving both the fastening tool and the selected element to a fastening position; and
   fastening the selected element to the component in a fastening operation.

7. The method of claim 6, further comprising:
   identifying the other one of the first and second elements as a second selected element using the stored element data; and
   transferring the second selected element to the other one of the first and second transfer stations during the fastening operation of the selected element.

8. The method of claim 7, further comprising:
   rotating the fastening tool on the carrier to the other one of the first and second transfer stations having the second selected element; and
   capturing the second selected element using the fastening tool.

9. The method of claim 5, further comprising positioning both the first and second transfer stations about a common circle whose center point coincides with an axis of rotation of the fastening tool.

10. The method of claim 5, further comprising differentiating the first and second elements by at least one of a length, a diameter, and a material.

11. A method for fastening an element to a component using a fastening system head, a carrier, and a transfer station, the method comprising:
    storing element data characterizing the element in a memory;
    incorporating a test device with the fastening system head;
    rotating the fastening tool together with the test device on the carrier to the transfer station;
    capturing an element prepositioned at the transfer station using the fastening tool; and
    inspecting the element using the test device for conformance to the element data.

12. The method of claim 11, further comprising moving both the fastening tool and the element to a fastening position only if the element data conforms to the element data.

13. The method of claim 12, further comprising fastening the element to the component in a fastening operation.

14. The method of claim 11, further comprising rejecting the element by opening the fastening tool if the element does not conform to the element data.

15. The method of claim 14, further comprising reloading a new element at the transfer station after the ejecting step.

16. The method of claim 14, further comprising inspecting a length and a diameter of the element using the test device.

* * * * *